(12) United States Patent
Vishwakarma et al.

(10) Patent No.: US 11,604,701 B2
(45) Date of Patent: Mar. 14, 2023

(54) SYSTEM AND METHOD FOR SCHEDULING BACKUP WORKLOADS USING A TRAINED JOB RESOURCE MAPPING MODEL

(71) Applicant: EMC IP Holding Company LLC, Hopkinton, MA (US)

(72) Inventors: Rahul Deo Vishwakarma, Bangalore (IN); Shelesh Chopra, Bangalore (IN); Parminder Singh Sethi, Ludhiana (IN); Parmeshwr Prasad, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 68 days.

(21) Appl. No.: 17/238,885

(22) Filed: Apr. 23, 2021

(65) Prior Publication Data
US 2022/0350708 A1    Nov. 3, 2022

(51) Int. Cl.
*G06F 16/27* (2019.01)
*G06F 11/14* (2006.01)

(52) U.S. Cl.
CPC ...... *G06F 11/1448* (2013.01); *G06F 2201/80* (2013.01)

(58) Field of Classification Search
CPC .......................... G06F 11/1448; G06F 2201/80
See application file for complete search history.

(56) References Cited

U.S. PATENT DOCUMENTS

| | | | |
|---|---|---|---|
| 10,089,144 B1* | 10/2018 | Nagpal | G06F 9/5027 |
| 2018/0157565 A1* | 6/2018 | Warnes | G06F 11/1458 |
| 2021/0374021 A1* | 12/2021 | Santhakumar | G06F 11/3485 |

\* cited by examiner

*Primary Examiner* — Etienne P Leroux
*Assistant Examiner* — Cindy Nguyen
(74) *Attorney, Agent, or Firm* — Chamberlain, Hrdlicka, White, Williams & Aughtry (57) ABSTRACT

Techniques described herein relate to a method for managing jobs. Such techniques may include: generating a job completion entry that specifies that execution of a first job was completed within an estimated period of time for the first job, generating a second job completion entry that specifies that execution of a second job was not completed within a second estimated period of time for the second job, updating the job resource mapping model based on the first job completion entry and the second job completion entry to obtain a new updated job resource mapping model.

17 Claims, 6 Drawing Sheets

SYSTEM AND METHOD FOR SCHEDULING BACKUP WORKLOADS USING A TRAINED JOB RESOURCE MAPPING MODEL

BACKGROUND

Computing devices often store data on one or more storage devices included in and/or operatively connected to the computing device. Such data may be backed up from time to time using scheduled or user-initiated backup jobs. Though backup jobs often succeed, they may, at times, fail.

SUMMARY

In general, embodiments described herein relate to a method for forecasting backup failures. The method may include: generating a job completion entry that specifies that execution of a first job was completed within an estimated period of time for the first job, generating a second job completion entry that specifies that execution of a second job was not completed within a second estimated period of time for the second job, updating the job resource mapping model based on the job completion entry and the second job completion entry to obtain a new updated job resource mapping model, obtaining, by a backup manager, a new set of jobs to be executed, generating, by a job time estimator, an estimated period of time for each job in the new set jobs to obtain a set of estimated periods of time, wherein the job estimator is not modified using the job completion entry or the second job completion entry, performing, using the set of estimated periods of time, a job resource mapping for each job in the new set of jobs using the updated job resource mapping model, wherein the first job and the second job are not in the new set of jobs, and scheduling of the new set of jobs on a set of resources based on the job resource mapping, wherein execution of at least one of the new set of jobs is initiated after the scheduling.

In general, embodiments described herein relate to a non-transitory computer readable medium comprising computer readable program code, which when executed by a computer processor enables the computer processor to perform a method for forecasting backup failures. The method may include: generating a job completion entry that specifies that execution of a first job was completed within an estimated period of time for the first job, generating a second job completion entry that specifies that execution of a second job was not completed within a second estimated period of time for the second job, updating the job resource mapping model based on the job completion entry and the second job completion entry to obtain a new updated job resource mapping model, obtaining, by a backup manager, a new set of jobs to be executed, generating, by a job time estimator, an estimated period of time for each job in the new set of jobs to obtain a set of estimated periods of time, wherein the job estimator is not modified using the job completion entry or the second job completion entry, performing, using the set of estimated periods of time, a job resource mapping for each job in the new set of jobs using the updated job resource mapping model, wherein the first job and the second job are not in the new set of jobs, and scheduling of the new set of jobs on a set of resources based on the job resource mapping, wherein execution of at least one of the new set of jobs is initiated after the scheduling.

In general, embodiments described herein relate to a system for forecasting backup failures. The system may include: a plurality of client devices each including a processor, a memory, and a persistent storage device; a plurality of storage devices; and a backup storage controller operatively connected to the plurality of client devices and the plurality of storage devices. The backup storage controller may be configured to: generate a job completion entry that specifies that execution of a first job was completed within an estimated period of time for the first job, generate a second job completion entry that specifies that execution of a second job was not completed within a second estimated period of time for the second job, update the job resource mapping model based on the job completion entry and the second job completion entry to obtain a new updated job resource mapping model, obtain, by a backup manager, a new set of jobs to be executed, generate, by a job time estimator, an estimated period of time for each job in the new set of jobs to obtain a set of estimated periods of time, wherein the job estimator is not modified using the job completion entry or the second job completion entry, perform, using the set of estimated periods of time, a job resource mapping for each job in the new set of jobs using the updated job resource mapping model, wherein the first job and the second job are not in the new set of jobs, and schedule of the new set of jobs on a set of resources based on the job resource mapping, wherein execution of at least one of the new set of jobs is initiated after the scheduling.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments of the invention relate to a method and system for managing a data protection environment. Specifically, embodiments of the invention relate to methods for scheduling workloads corresponding to data protection (e.g., backup generation, backup storage, clone generation, virtual machine migration, etc.). Embodiments of the invention include storing estimation prediction entries in a job completion database that is used to retrain a workload scheduling model to improve the allocation of available resources to a workload based on previous executions of similar workloads. The job completion database may specify, for example, a number of resources allocated to a workload, an estimated time to completion determined prior to the execution, whether the execution met the estimated time to completion, and, if the execution time does not meet the estimated time, the difference between the expected time and the actual time. The job completion database may be applied to the workload scheduling model for further training.

A backup storage controller may initiate execution of workloads. In one or more embodiments of the invention, a workload is a process for completing one or more jobs relating to protecting the data stored in and/or applications executing in the clients. Examples of jobs executing in a workload may include, for example, a backup generation, a backup storage of a generated backup, a cloning of an application (or application instance), a migration of a virtual machine or application container, and/or any other type of job without departing from the invention.

The initiation of the workload may include determining the workload. The workload may be determined by identifying the jobs to be completed, performing a prioritization of the jobs using any mechanism of prioritization without departing from the invention, determining the resources to be allocated to each job that enables the job to be executed within an estimated amount of time. Following the determination of the workload, the backup application may further initiate the execution of the workload by sending workload execution requests to the backup server that specify executing the workload as determined. The backup server may include functionality for executing such workloads as requested.

In one or more embodiments of the invention, the determination of the workload and the use of the workload scheduling model may be implemented using four phases: planning, synthesis, formulation, and execution. Other phases, either prior, intermediate to, or following the aforementioned phases, may be performed without departing from the invention.

In one or more embodiments of the invention, during the planning phase, the future resource utilization pattern is estimated. A method for estimating backup job completion time may be performed to perform the estimation of job completions. A job time estimator may perform the estimation and maintain continuous exchange of information with the backup application.

In one or more embodiments of the invention, during the synthesis phase, each incoming job is prioritized based on rule-based heuristics or machine learning based scoring methods. Other methods for prioritization may be performed without departing from the invention.

In one or more embodiments of the invention, during the formulation phase, the job scheduling policy is translated as an optimization problem that is used to minimize the makespan (e.g., minimize time taken to execute a workload) and maximize the throughput.

In one or more embodiments of the invention, during the execution phase, a deep reinforcement learning framework with guided optimization is performed as workloads are executed and job completion entries are generated and stored in the job completion database. The agent (e.g., the backup agent) learns critical decision-making policies directly from experience (e.g., using the job completion database) and adapts to the continuously changing environment in which the workloads are executing. In one or more embodiments of the invention, the deep reinforcement learning framework is well-suited to resource the management systems.

Figure 1:
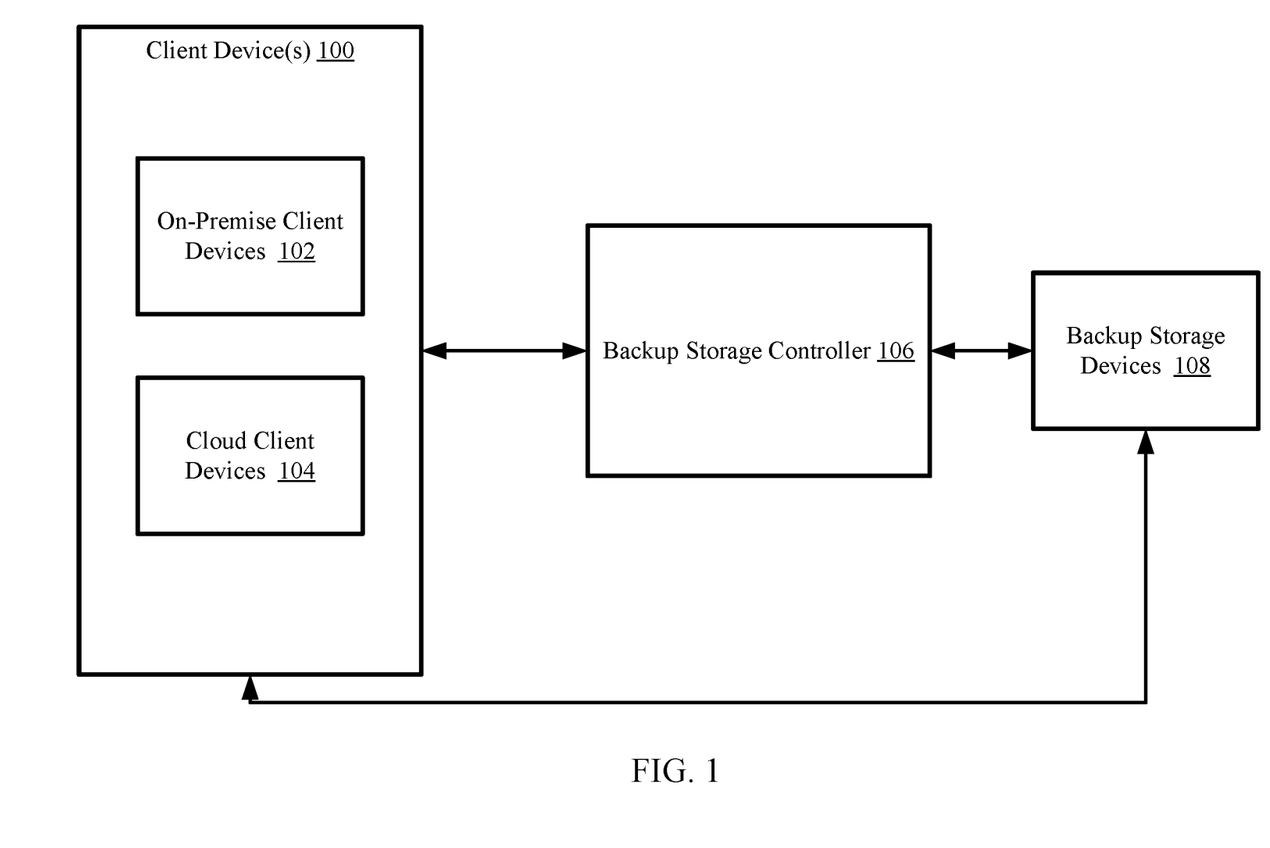
FIG. 1 shows a diagram of a system in accordance with one or more embodiments of the invention.

FIG. 1 shows a diagram of a system in accordance with one or more embodiments described herein. The system may include any number of client devices (100), which may exist within one or more cloud computing environments (e.g., cloud client devices (104)) or be located on the premises of a given entity (e.g., on-premise client devices (102)). The client devices (100) may be operatively connected to any number of storage devices (108) for storing backups. Both the client devices (100) and the storage devices (108) may be operatively connected to one or more backup storage controllers (e.g., backup storage controller (106)) that orchestrate backup of client data to storage devices (108). Each of these components is described below.

In one or more embodiments, a client device (100) is a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices, which may collectively be referred to as a computing device. Other types of computing devices may be used without departing from the scope of the invention.

In one or more embodiments, a set of client devices (100) may form all or a portion of a data domain. In one or more embodiments, a data domain is any set of client devices (100) for which backup services are performed, such as, for example, data backup, disaster recovery, backup data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, client devices (100) may be located in any of a variety of locations. For example, certain sets of client devices (100) may be located at one or more locations of a given entity (e.g., a company) and may be referred to as on-premise client devices (102). Other client devices (100) may be located with one or more cloud service providers, and may be referred to as cloud client devices (104). In one or more embodiments, any collection of client devices in any or all such locations are collectively referred to as client devices (100).

The client devices (100) may be implemented as production hosts executing any number of heterogeneous applications. Examples of applications include, but are not limited to, virtual machines, instances of databases, file systems, internet of things (IoT) devices, application containers, and/or storage devices. Other types of applications may be executing in the clients without departing from the invention.

In one or more embodiments, client devices (100) are operatively connected to a backup storage controller (106). In one or more embodiments, a backup storage controller (106) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a backup storage controller (106) includes functionality to obtain data items relating to client data backup jobs from client devices (100) and storage devices (108). Such data items may include, but are not limited to: storage capacity; system model; operating system version information; a set of data collections and/or types to be backed up; whether or not data is encrypted by the client; whether or not data is to be encrypted when stored by a storage device; backup media type (disk, tape, etc.); whether or not garbage collection services are running; number of concurrent backups from clients and/or to storage devices; storage characteristics (e.g., information about type of media used for backup, age of media, various attributes of the media, etc.); system model information (e.g., cluster information, generation of system, machine check exception history); information regarding updates and fixes made to an operating system after deployment of the operating system; and/or backup set and encryption engine information (e.g., AES, TME, MKTME, algorithms used, etc.). Other types of data items may be used without departing from the scope of embodiments described herein. Such data items may be stored by the backup storage controller (106) in a time series database and classified, per backup job, as either successful (i.e., the backup job was a success), or failed (i.e., the backup job was a failure).

In one or more embodiments, a backup storage controller (106) also includes functionality, using the aforementioned data items, to perform a predictive analysis (e.g., using a machine learning algorithm) to predict a time taken for a job in a workload to be completed. The estimated job completion time may be obtained using any job time estimation mechanism without departing from the invention. Additionally, as jobs are completed, the times taken for the jobs to complete may be tracked. The tracking of the jobs and the job time estimations may be used to determine the resources to be allocated to each incoming job. The backup storage controller (106) may further include functionality for scheduling the incoming jobs in accordance with the resource allocations. The scheduling may include sending job requests to the client devices (100) to execute the jobs using the aforementioned allocated resources. Backup storage controllers (106) are discussed further in the description of FIG. 2, below.

In one or more embodiments, the client devices (100) and the backup storage controller are operatively connected to backup storage devices (108). In one or more embodiments, a backup storage device (108) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the storage devices (108) include functionality to store backup copies of data of any type for which the source is any of the client devices (100)

While FIG. 1 shows a configuration of components, other configurations may be used without departing from the scope of embodiments described herein. For example, the client devices may all be located at a same location, located at two or more on-premise locations of an entity, all located in cloud locations provided by a cloud services provider, and/or any combination thereof. As another example, there may be any number of devices that collectively form the backup storage controller. As another example, there may be any number of storage devices for storing backup data from backup jobs. As another example, any or all of the components shown in FIG. 1 may be located at a same location, or located at separate locations in any combination. Accordingly, embodiments disclosed herein should not be limited to the configuration of components shown in FIG. 1.

Figure 2:
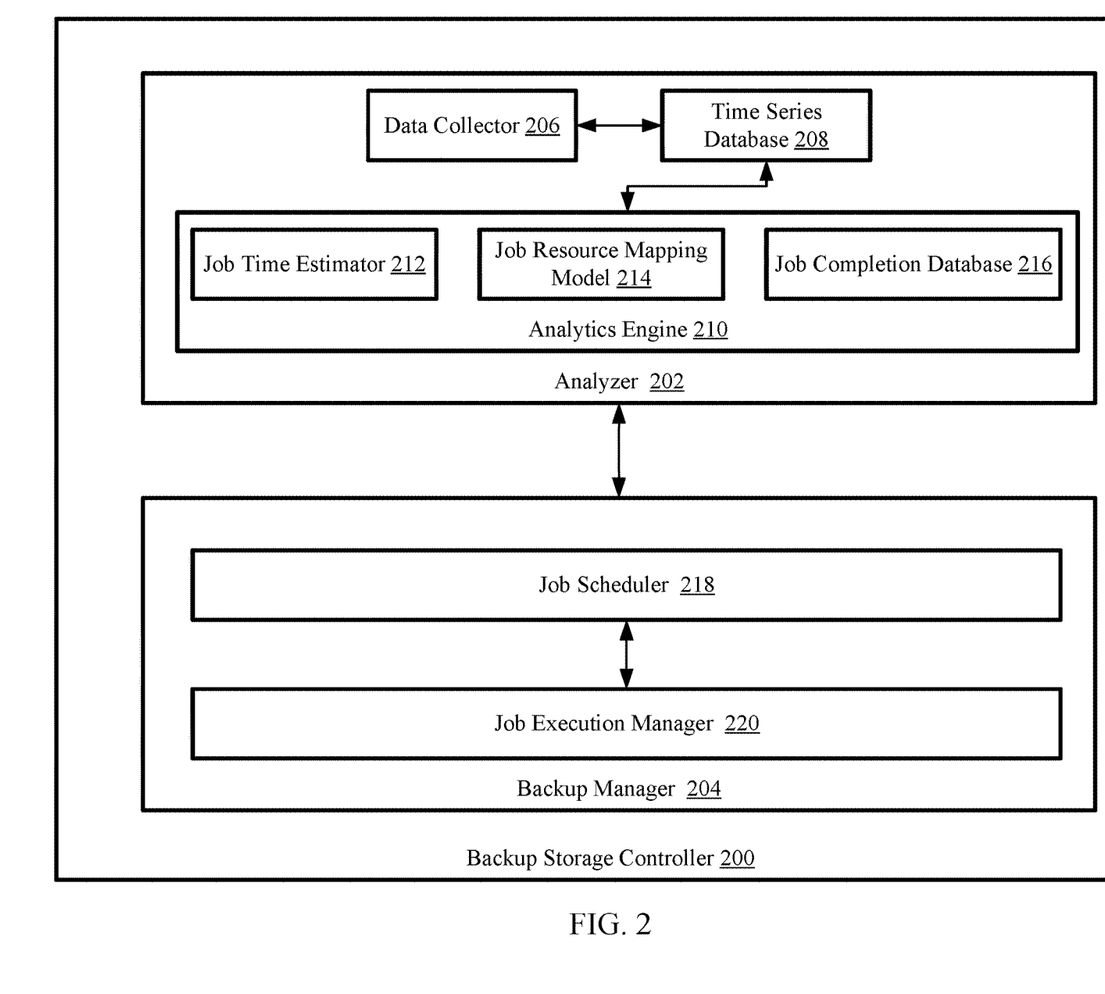
FIG. 2 shows a diagram of a backup storage controller in accordance with one or more embodiments of the invention.

FIG. 2 shows a diagram of a backup storage controller (200) in accordance with one or more embodiments described herein. The backup storage controller (200) may include an analyzer (202). The analyzer may include a data collector (206), a time series database (208), and an analytics engine (210). The analytics engine (210) may include a job time estimator (212), a job resource mapping model (214), and a job completion database (216). The backup storage controller (200) may also include a backup manager (204). The backup manager may include a job scheduler (218) and an job execution manager (220). Each of these components is described below.

In one or more embodiments, the backup storage controller (200) is substantially similar to the backup storage controller (106). As such, it may include any number of computing devices to implement functionality described herein.

In one or more embodiments, an analyzer (202) is any hardware (e.g., circuitry), software, firmware, or any combination thereof that includes functionality to perform an analysis to yield a ranked list of backup jobs that are predicted to fail, the confidence associated with such predictions, and data items (i.e., variables) associated with a given backup job that may contribute, in whole or in part, to the predicted failure. For example, an analyzer (202) may be one or more processes executing on one or more processors of one or more computing devices of the backup storage controller (200).

In one or more embodiments, the analyzer (202) includes a data collector (206). In one or more embodiments, a data collector (206) is any hardware (e.g., circuitry), software, firmware, or any combination thereof that includes functionality to obtain data items (discussed above in the description of FIG. 1) associated with backup jobs for backing up data from client devices to backup storage devices. For example, a data collector (206) may be one or more processes executing on one or more processors of one or more computing devices of the backup storage controller (200).

In one or more embodiments, the analyzer (202) also includes a time series database (208). In one or more embodiments, a time series database (208) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, a time series database (208) is a database that records entries as a series of sets of data items associated with a backup job performed at a given time, and whether or not the backup job performed at that time was a success or failure. In one or more embodiments, a time series database (208) stores entries for series of backups associated with a backup job that have all been successful, and entries for series of backups associated with a backup job that ended up with a failure. For the former, all data items for the series of successful backups may be stored. For the latter, data items prior to the failure may be omitted from the entry, and the amount of time (e.g., the time window) for which data items after a failure are discarded may be configured by a data domain administrator.

In one or more embodiments, the analyzer (202) includes an analytics engine (210). In one or more embodiments, an analytics engine (210) is any hardware (e.g., circuitry), software, firmware, or any combination thereof that includes functionality to analyze data items (discussed above in the description of FIG. 1) associated with backup jobs for backing up data from client devices to backup storage devices. For example, a data collector (206) may be one or more processes executing on one or more processors of one or more computing devices of the backup storage controller (200). In one or more embodiments, the analytics engine (210) includes functionality to assess future backup jobs based on the aforementioned data items of previous backups to estimate a time for backup completion, determine resources to be allocated to each backup job, and to maintain a historical record of job completions and whether they were completed within an estimated time period.

In one or more embodiments, the analytics engine (210) includes a job time estimator (212). In one or more embodiments, a job time estimator (212) is any hardware (e.g., circuitry), software, firmware, or any combination thereof that includes functionality to use the aforementioned data items obtained by data collector (206) and stored in the time series database (208) to estimate a job completion time for a backup job. In one or more embodiments, the job time estimator uses any machine learning algorithm to make the estimation. For example, a nearest neighbor algorithm may be used to make the estimation. Such an estimation may be made, for example, by comparing the data items associated with a given instance of a backup to be made pursuant to a planned backup job execution to the set of backup instances for the backup job stored in the time series database (208). In one or more embodiments, a job time estimation is generated for each backup job.

In one or more embodiments, the analytics engine (210) also includes a job resource mapping model (214). In one or more embodiments, a job resource mapping model (214) is a model for allocating resources in the client devices to each job (e.g., a backup job). The job resource mapping model (214) may be based on previous executions as specified in the job completion database (216) (further discussed below). The job resource mapping model (214) may be further based on the job time estimations generated. For example, a job may specify completion within a period of time. The job resource mapping model may input the period of time to determine sufficient resources that, when executing the job, suffice the execution of the job within the period of time. Further, the job resource mapping model (214) may be updated in accordance with FIG. 3B.

In one or more embodiments, the analytics engine (210) also includes a job completion database (216). In one or more embodiments, the job completion database (216) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

The job completion database (216) may be a database that stores job completion entries. The job completion entries may specify details regarding the execution, completion, and allocation of resources for a job. The details may specify, for example, the resources allocated, the resources utilized for the job, whether the job was completed within a specified job time estimation, and, if not, a value representing the difference between the job time estimation and the actual execution time. Additional values may be used to represent a comparison between the job time estimation and the actual execution time. For example, for jobs in which the actual execution time was within the job time estimation, a negative value may be stored in the job completion entry of the jobs. Other values may be applied based on the comparison between the job time estimation and the actual execution time of a job without departing from the invention.

In one or more embodiments, the backup storage controller (200) also includes a backup manager (204). In one or more embodiments, a manager (204) is any hardware (e.g., circuitry), software, firmware, or any combination thereof that includes functionality to receive the results of the analyses performed by the analyzer (202).

In one or more embodiments, the backup storage controller (200) includes a job scheduler (218). In one or more embodiments, a job scheduler (218) is any hardware (e.g., circuitry), software, firmware, or any combination thereof that includes functionality to receive the results of the analyses performed by the analyzer (202), and to organize such results into a data structure. For example, the data structure may be a table that includes a client device identifier, a backup job identifier, and information indicating the resources to be allocated to a job.

In one or more embodiments, the backup storage controller (200) includes a job execution manager (220). In one or more embodiments, a job execution manager (220) is any hardware (e.g., circuitry), software, firmware, or any combination thereof that includes functionality to take the data structure created by the job scheduler (218) and initiate execution of the jobs. For example, the job execution manager (220) may send job execution requests to the client devices to initiate the execution of the jobs in accordance with the data structure.

While FIG. 2 shows a configuration of components, other configurations may be used without departing from the scope of embodiments described herein. Accordingly, embodiments disclosed herein should not be limited to the configuration of components shown in FIG. 2.

Figure 3A:
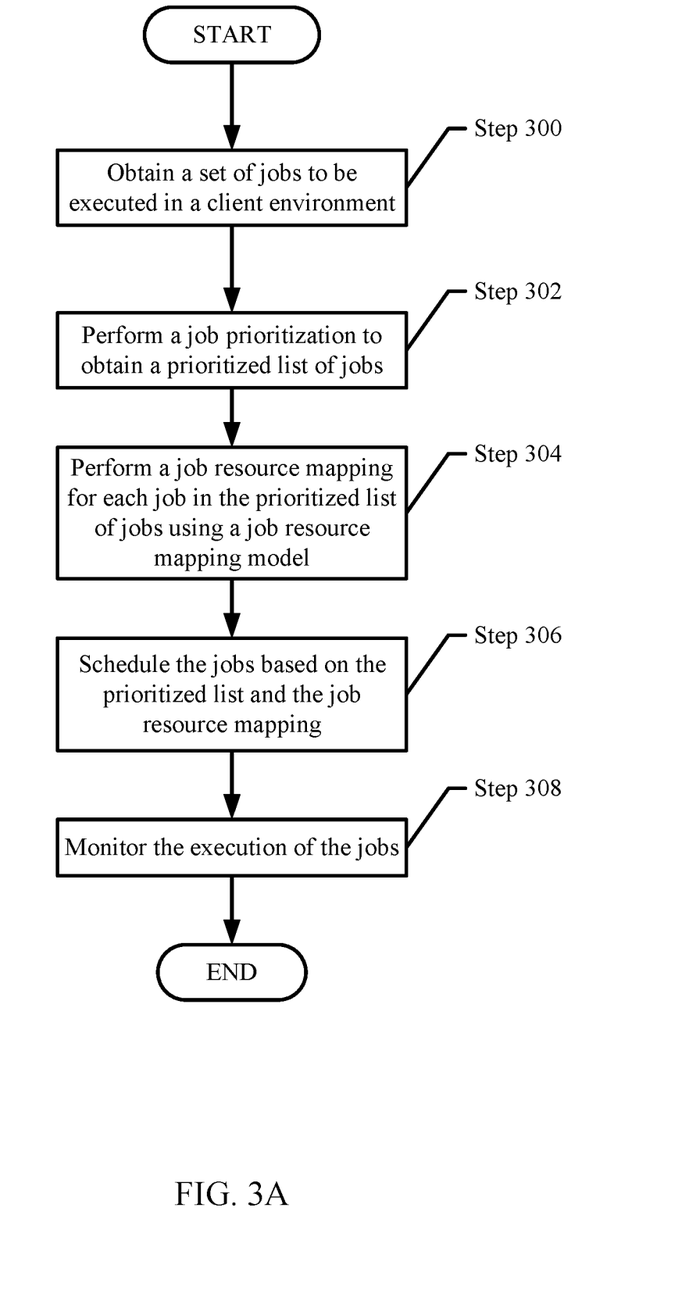
FIG. 3A shows a flowchart in accordance with one or more embodiments of the invention.

FIG. 3A shows a flowchart describing a method for initiating jobs in accordance with one or more embodiments disclosed herein.

While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, a set of jobs to be executed in a client environment are obtained. In one or more embodiments, the set of jobs may correspond to a workload. The workload may include any number of jobs. As discussed above, each job may specify performing any type of data protection for a component such as, for example, an application, a virtual machine, a virtual container hosting any number of applications, and/or a database.

In Step 302, a job prioritization is performed to obtain a prioritized list of jobs. In one or more embodiments of the invention, the job prioritization is a process for prioritizing the order of execution of each job in the workload. The prioritization may be performed based on details of the job. For example, the details of the jobs may include for example, a data size of the corresponding component, a read rate of the data of the component, a write rate of the data of the component, a pre-assigned priority of the component, a required size of resources to execute the job. Other details may be utilized to perform the job prioritization without departing from the invention. The details of the jobs may be categorized. For example, the write rate of the data of a component may be categorized with highest value, and the job prioritization may be performed such that the jobs for components with the highest priority are prioritized higher than jobs of components with lower write rates. As another example, the jobs with the largest size of data may be prioritized higher than the data with the lowest data size. The result of the job prioritization is a prioritized list of jobs with an assigned priority.

In Step 304, a job resource mapping for each job in the prioritized list of jobs using a job resource mapping model is performed. In one or more embodiments of the invention, the job resource mapping model may obtain as an input the details of the job as discussed above, a job estimation model previously generated by the backup storage controller, and output a set of resources to be allocated to the job. In one or more embodiments of the invention, the job resource mapping is performed to each job sequentially in an order based on the prioritization list. In other words, the resources are allocated in an order from most prioritized first to least prioritized last.

In Step 306, the jobs are scheduled based on the prioritized list and the results of the job resource mapping. In one or more embodiments of the invention, the jobs are scheduled in accordance with the allocated resources. A job scheduler of the backup storage controller may send job execution requests to the client devices performing the jobs based on the allocated resources.

In Step 308, the execution of the jobs are monitored. In one or more embodiments of the invention, the job scheduler, or any other entity, monitors execution by awaiting a response from the client devices that specifies details of the execution of the device. As the jobs are completed, the client devices may notify the backup storage controller. The processing of such notifications may be specified in FIG. 3B.

Figure 3B:
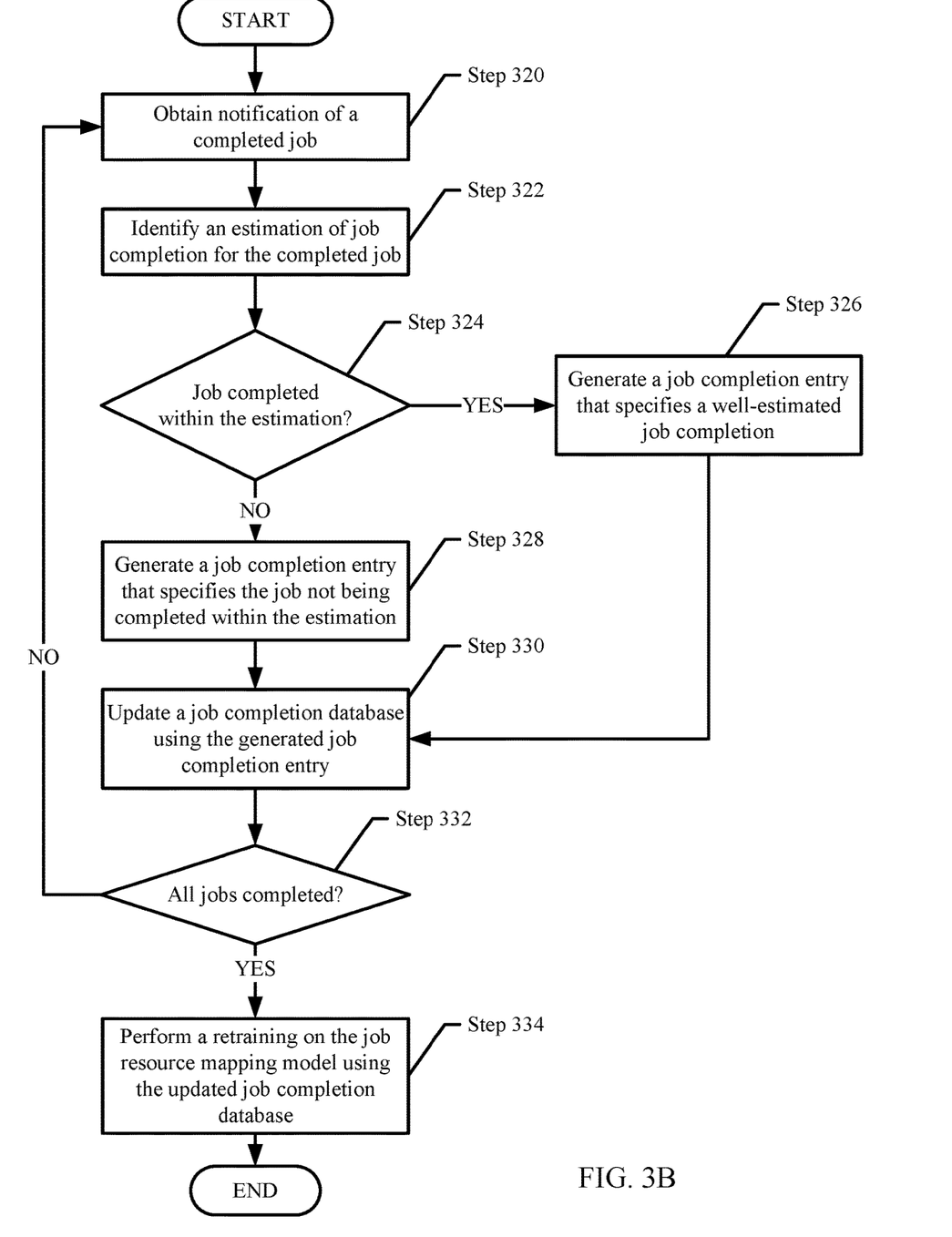
FIG. 3B shows a flowchart in accordance with one or more embodiments of the invention.

FIG. 3B shows a flowchart describing a method for managing job completions in accordance with one or more embodiments disclosed herein.

While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 320, a notification is obtained of a completed job. The notification may include details regarding the completion of a job. The notification may be obtained from a client device executing the job. For example, the notification specifies an execution time of the job.

In Step 322, an estimation of job completion is identified for the completed job. The estimation (e.g., a job time estimation) is identified from a job estimator that generates the job time estimation prior to the completion of the job.

In Step 324, a determination is made about whether the job is completed within the job time estimation. The determination may be made by comparing the generated job time estimation to the actual execution time and determining whether the actual execution time is less than the job time estimation. If the job is completed within the job time estimation, the method proceeds to Step 326; otherwise, the method proceeds to Step 328.

In Step 326, a job completion entry is generated. The job completion entry specifies the completion of the job, as well as the fact that the job was completed in an expected time frame. Such fact may be specified in the job completion entry. In one or more embodiments of the invention, the job completion entry further specifies a value that is based on the fact that the actual execution time was less than the job execution time. For example, the value may be a negative numerical value.

In Step 328, a job completion entry is generated that specifies the job not being completed within the job time estimation. In one or more embodiments of the invention, the job completion entry further specifies a value that is based on the fact that the actual execution time was more than the job execution time. For example, the value may be a numerical value that is a function of the job time estimation and the actual execution time.

In Step 330, a job completion database is updated using the generated job entry. In one or more embodiments of the invention, the job completion database is updated by including the generated job completion entry in the job completion database. The generated job completion entry may be the job completion entry of either Step 328 or Step 326.

In Step 332, a determination is made about whether all jobs are completed.

If all jobs are completed, the method proceeds to Step 334; otherwise, the backup storage controller waits until the method proceeds to Step 320.

In Step 334, a retraining is performed on the job resource mapping model using the updated job completion database. In one or more embodiments of the invention, the retraining includes performing a machine learning algorithm on the job completion entries (and any other data included therein) similar to that used to generate the job resource mapping model. The machine learning algorithm may include applying the job time estimations specified in the job completion entries, identifiers of the resources allocated to each job, and the numerical value stored in the job completion entries generated based on the comparison between the actual execution times and the corresponding job time estimations (discussed above) to the job resource mapping model to obtain an updated job resource mapping model. In one or more embodiments of the invention, the machine learning algorithm used may be a neural network machine learning model. The neural network machine learning may utilize any number of neural layers, and/or back propagations without departing from the invention.

Figure 4:
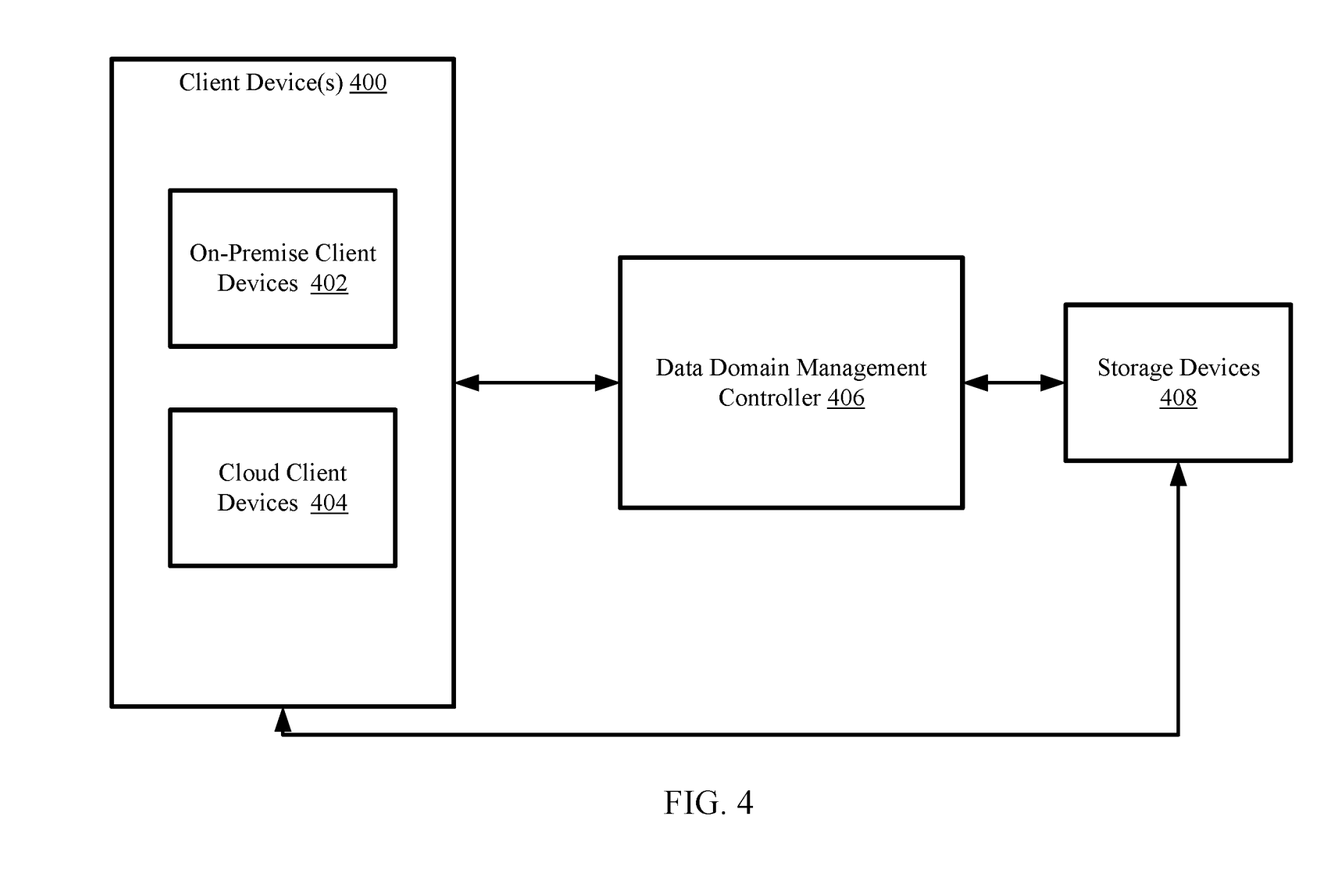
FIG. 4 shows an example in accordance with one or more embodiments of the invention.

FIG. 4 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4, consider a scenario in which a set of client devices (400) within a data domain includes a set of client devices that are at a location of a particular entity (e.g., on-premise client devices (402)) and another set that is located in a cloud of a cloud service provider (e.g., cloud client devices (404)). The collection of client devices (400) may represent all or part of a data domain. In one or more embodiments, the client devices (400) are operatively connected to a set of storage devices (408) to which client data is backed up periodically via a series of backup jobs. In one or more embodiments, the backup of data from client devices (400) to storage devices (408) is managed by a data domain management controller (406).

In the aforementioned scenario, the data domain management controller (406), stores entries in a time series database. The entries stored in the time series database are used to estimate job completion times for a set of jobs. In this example, the jobs are backup instances of the client data.

Next, the data domain management controller (406) assesses a set of planned future backup instances that are to occur within the defined time window. The assessment includes performing the method of FIG. 3A to prioritize the backup instances and allocating resources of each client device to be executing each backup instance. The allocation is performed using a job resource mapping model of the data domain management controller (406). The resources include any combination of processing and memory in the client devices (400). The data domain management controller (406) initiates scheduling of the backup instances based on the allocation of resources.

As each backup instance is completed in the client devices (400), the data domain management controller (406) is notified with the completion. A job completion entry is generated for each completed backup instance. Each generated job completion entry specifies the completion of the backup instance, the resources used to generate the allocated resources, and whether the backup instance was completed within a job time estimation. Backup instances that are completed within the corresponding job time estimation are awarded with a negative value specified in the corresponding job completion entry.

The generated job completion entries are used to retrain the job resource mapping model to generate an updated job resource mapping model. The updated job resource mapping model is used to allocate resources to future backup instances of the client data.

Figure 5:
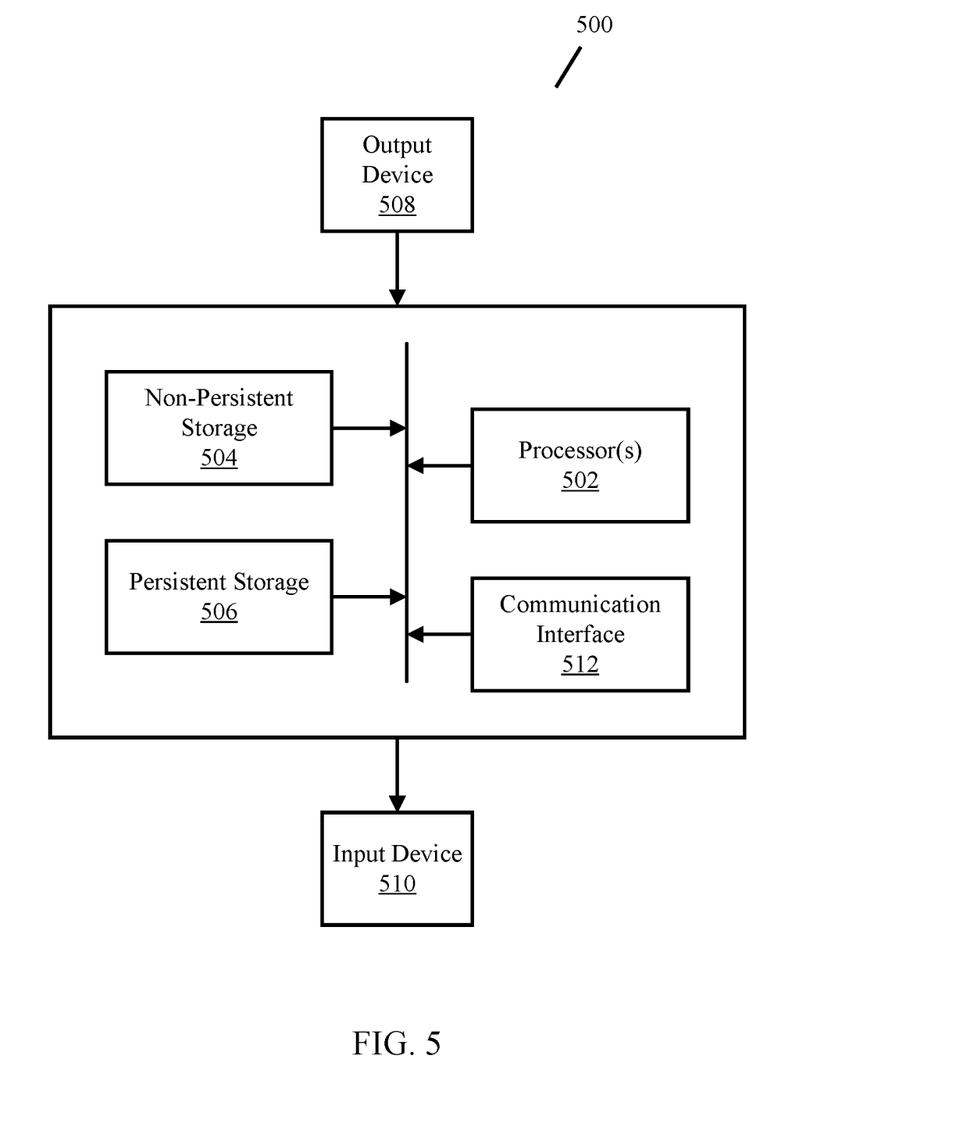
FIG. 5 shows a computing system in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing jobs, the method comprising:
    generating a job completion entry that specifies that execution of a first job was completed within an estimated period of time for the first job, wherein the first job comprises at least one of: a clone generation of an application executing in a first client device and a migration of the application between client devices;
    generating a second job completion entry that specifies that execution of a second job was not completed within a second estimated period of time for the second job, wherein the second job comprises at least one of: a second clone generation of a second application and a second migration of the second application between the client devices;
    updating the job resource mapping model based on the job completion entry and the second job completion entry to obtain a new updated job resource mapping model;
    obtaining, by a backup manager, a new set of jobs to be executed;
    generating, by a job time estimator, an estimated period of time for each job in the new set of jobs to obtain a set of estimated periods of time, wherein the job estimator is not modified using the job completion entry or the second job completion entry;
    performing, using the set of estimated periods of time, a job resource mapping for each job in the new set of jobs using the updated job resource mapping model, wherein the first job and the second job are not in the new set of jobs; and
    scheduling of the new set of jobs on a set of resources based on the job resource mapping, wherein execution of at least one of the new set of jobs is initiated after the scheduling.

2. The method of claim 1, wherein generating the job completion entry comprises:
    obtaining a notification that the job is complete;
    making a determination that the job was completed within the estimated period of time; and
    based on the determination, generating the job completion entry that specifies the job was completed within the estimated period of time.

3. The method of claim 2, further comprising:
    prior to performing the job resource mapping, obtaining the job time estimation of the job using the job time estimator.

4. The method of claim 1, wherein the execution of the job results in storage of a backup in a backup storage system.

5. The method of claim 1, wherein the job resource mapping model is based on job time estimations of previous executions of a previous set of jobs.

6. The method of claim 1, wherein the scheduling of the new set of jobs on the set of resources is further based on a prioritization associated with each job in the new set of jobs.

7. A non-transitory computer readable medium comprising computer readable program code, which when executed by a computer processor enables the computer processor to perform a method for managing jobs, the method comprising:
    generating a job completion entry that specifies that execution of a first job was completed within an estimated period of time for the first job, wherein the first job comprises at least one of: a clone generation of an application executing in a first client device and a migration of the application between client devices;
    generating a second job completion entry that specifies that execution of a second job was not completed within a second estimated period of time for the second job, wherein the second job comprises at least one of: a second clone generation of a second application and a second migration of the second application between the client devices;
    updating the job resource mapping model based on the job completion entry and the second job completion entry to obtain a new updated job resource mapping model;
    obtaining, by a backup manager, a new set of jobs to be executed;
    generating, by a job time estimator, an estimated period of time for each job in the new set of jobs to obtain a set of estimated periods of time, wherein the job estimator is not modified using the job completion entry or the second job completion entry;
    performing, using the set of estimated periods of time, a job resource mapping for each job in the new set of jobs using the updated job resource mapping model, wherein the first job and the second job are not in the new set of jobs; and
    scheduling of the new set of jobs on a set of resources based on the job resource mapping, wherein execution of at least one of the new set of jobs is initiated after the scheduling.

8. The non-transitory computer readable medium of claim 7, wherein generating the job completion entry comprises:
    obtaining a notification that the job is complete;
    making a determination that the job was completed within the estimated period of time;
    based on the determination, generating the job completion entry that specifies the job was completed within the estimated period of time.

9. The non-transitory computer readable medium of claim 8, further comprising:
    prior to performing the job resource mapping, obtaining the job time estimation of the job using the job time estimator.

10. The non-transitory computer readable medium of claim 7, wherein the execution of the job results in storage of a backup in a backup storage system.

11. The non-transitory computer readable medium of claim 7, wherein the job resource mapping model is based on job time estimations of previous executions of a previous set of jobs.

12. The non-transitory computer readable medium of claim 7, wherein the scheduling of the new set of jobs on the set of resources is further based on a prioritization associated with each job in the new set of jobs.

13. A system for forecasting backup failures, the system comprising:

a plurality of client devices each comprising a processor, a memory, and a persistent storage device;

a plurality of storage devices; and a backup storage controller operatively connected to the plurality of client devices and the plurality of storage devices, and configured to:

generate a job completion entry that specifies that execution of a first job was completed within an estimated period of time for the first job, wherein the first job comprises at least one of: a clone generation of an application executing in a first client device and a migration of the application between client devices;

generate a second job completion entry that specifies that execution of a second job was not completed within a second estimated period of time for the second job, wherein the second job comprises at least one of: a second clone generation of a second application and a second migration of the second application between the client devices;

update the job resource mapping model based on the job completion entry and the second job completion entry to obtain a new updated job resource mapping model;

obtain, by a backup manager, a new set of jobs to be executed;

generate, by a job time estimator, an estimated period of time for each job in the new set of jobs to obtain a set of estimated periods of time, wherein the job estimator is not modified using the job completion entry or the second job completion entry;

perform, using the set of estimated periods of time, a job resource mapping for each job in the new set of jobs using the updated job resource mapping model, wherein the first job and the second job are not in the new set of jobs; and schedule of the new set of jobs on a set of resources based on the job resource mapping, wherein execution of at least one of the new set of jobs is initiated after the scheduling.

14. The system of claim 13, wherein generating the job completion entry comprises:

obtaining a notification that the job is complete;

making a determination that the job was completed within the estimated period of time; and based on the determination, generating the job completion entry that specifies the job was completed within the estimated period of time.

15. The system of claim 14, wherein the backup storage controller is further programmed to:

prior to performing the job resource mapping, obtain the job time estimation of the job using the job time estimator.

16. The system of claim 13, wherein the job resource mapping model is based on job time estimations of previous executions of a previous set of jobs.

17. The system of claim 13, wherein the scheduling of the new set of jobs on the set of resources is further based on a prioritization associated with each job in the new set of jobs.

* * * * *